US005691404A

United States Patent [19]
Kasowski et al.

[11] Patent Number: 5,691,404
[45] Date of Patent: Nov. 25, 1997

[54] FIRE RESISTANT POLYAMIDE COMPOSITIONS

[75] Inventors: Robert Valentine Kasowski, West Chester, Pa.; Marvin Michael Martens, Vienna, W. Va.

[73] Assignee: E. I. Du Pont de Nemours and Company, Wilmington, Del.

[21] Appl. No.: 659,603

[22] Filed: Jun. 6, 1996

Related U.S. Application Data

[60] Provisional application No. 60/000,337 Jun. 20, 1995.

[51] Int. Cl.⁶ .............. C08K 5/3492; C08K 5/3462; C08K 5/20; C07F 11/00
[52] U.S. Cl. .............. 524/100; 524/100; 524/227; 524/387; 524/406; 544/181
[58] Field of Search .............. 544/181; 524/406, 524/101, 387, 227, 100

[56] References Cited

U.S. PATENT DOCUMENTS

| | | | |
|---|---|---|---|
| 3,458,470 | 7/1969 | Edgar | 260/37 |
| 3,465,060 | 9/1969 | Oldham | 524/406 |
| 3,901,850 | 8/1975 | Kurtz | 524/406 |
| 3,936,416 | 2/1976 | Brady et al. | 260/42.18 |
| 3,975,359 | 8/1976 | Dickens | 524/406 |
| 4,010,137 | 3/1977 | Brady et al. | 260/45.8 |
| 4,042,561 | 8/1977 | DeEdwardo et al. | 524/122 |
| 4,208,322 | 6/1980 | Sandler | 260/45.75 |
| 4,295,886 | 10/1981 | Gresham | 106/18.19 |
| 4,298,518 | 11/1981 | Ohmura et al. | 260/32.6 |
| 4,314,927 | 2/1982 | Theysohn et al. | 260/37 |
| 4,526,906 | 7/1985 | Wegner | 521/107 |
| 4,535,096 | 8/1985 | Jacobs et al. | 521/107 |
| 4,670,483 | 6/1987 | Hall et al. | 523/179 |
| 4,741,740 | 5/1988 | Davis et al. | 8/490 |
| 4,786,673 | 11/1988 | Morival et al. | 524/101 |
| 5,071,894 | 12/1991 | Weil et al. | 524/127 |
| 5,167,876 | 12/1992 | Lem et al. | 252/602 |
| 5,424,344 | 6/1995 | Lewin | 524/83 |
| 5,482,985 | 1/1996 | Baierweck et al. | 524/101 |

FOREIGN PATENT DOCUMENTS

| | | |
|---|---|---|
| 2130793 | 1/1973 | Germany. |
| 2150484 | 5/1973 | Germany. |
| 4436281 | 4/1996 | Germany. |
| 58-222073 | 12/1983 | Japan .................. 544/181 |
| 59-008754 | 1/1984 | Japan .................. 524/406 |
| 2097008 | 10/1982 | United Kingdom .... 524/101 |

OTHER PUBLICATIONS

Lipska, A. E., "The Fire Retardance ... Synthetic Materials" 1973 Spring Meeting, Western States Section, The Combustion Institute, Arizona State University, WSC 1973.

E. Weil and B. McSwigan, MPP in Flame–Retardant Coatings: Old Products with New Potential, *Journal of Coatings Tech.*, 66, 75, 1994.

D. Brady et al., Intumescense: A Novel Approach to Flame Retard PP, *Journal of Fire Retardant Chem.*, 4, 150, 1977.

Troitzsch, Methods for the Fire Protection of Plastics and Coatings by Flame Retardant and Intumescent Systems, *Chemische Werke Huls AG*, D 437, 41–65, Marl (F.R.G.).

*Primary Examiner*—Veronica P. Hoke

[57] ABSTRACT

Disclosed herein are compositions containing an aliphatic polyamide, a selected tungstic acid or its salt, and a coagent such as melamine cyanurate. These compositions exhibit good fire resistance and good physical toughness, particularly good elongation, and are useful as molding resins. The reaction product of a tungstic acid and melamine may alternatively be incorporated.

22 Claims, No Drawings

FIRE RESISTANT POLYAMIDE COMPOSITIONS

This application claims the priority benefit of U.S. Provisional Application 60/000,337, filed Jun. 20, 1995.

FIELD OF THE INVENTION

This invention provides compositions containing aliphatic polyamides, certain tungstic acid compounds, and a coagent such a melamine cyanurate. These compositions have a combination of good physical properties and improved fire resistance.

TECHNICAL BACKGROUND

Synthetic aliphatic polyamides, such as nylon-6,6 and nylon-6, and copolymers thereof, are often used for molded articles and fibers. In many uses, particularly for molded articles, it is preferred if the polyamide has improved (compared to the polyamide alone) resistance to fire. This is often attained by the addition of various agents which improve the basic fire resistance of the polyamide, but sometimes these agents degrade or diminish other physical properties of the polyamide. Since polyamides are widely used, compositions which have improved fire resistance but yet retain the desirable physical properties of the polyamide are constantly being sought.

German Patents 2,150,484 and 2,130,793, and A. E. Lipska, Comb. Inst. Arizona State Univ., West. State Sect. Cornbust, Inst. WSCI, 1973, report that certain tungsten compounds can be used in various ways to improve the fire resistance of polyamides. The combinations of agents described hereinafter are not disclosed in these references.

U.S. Pat. No. 4,298,518 discloses compositions containing polyamides and melamine cyanurate, which are said to have good fire resistance. Tungsten compounds are not mentioned in this patent.

U.S. Pat. No. 3,458,470 discloses compositions containing polyamides and a variety of tungsten or molybdenum compounds, including silico- and phosphotungstic acids. These compositions are said to have good resistance to discoloration and be stable to light.

Clearly, what is needed is a fire resistant polyamide composition which does not have the problems and deficiencies of the prior art. Other objects and advantages of the present invention will become apparent to those skilled in the art upon reference to the detailed description of the invention which follows hereinafter.

SUMMARY OF THE INVENTION

This invention provides a composition, comprising:
(a) a synthetic, aliphatic polyamide;
(b) about 0.1 to about 6 weight percent of a metallic tungstic acid salt or a complex oxide acid of tungsten and a metalloid; and
(c) about 2 to about 6 percent by total weight of one or more coagents selected from the group consisting of melamine cyanurate, uracil, xanthine and oxamide,
and wherein all percents by weight are based on the total weight of (a)+(b)+(c).

Also described herein is a composition, comprising, the product made by contacting in aqueous medium silicotungstic acid or phosphotungstic acid with melamine, wherein the molar ratio of said melamine to said silicotungstic acid or phosphotungstic acid is about 28:1 to about 1:1.

DETAILED DESCRIPTION OF THE PREFERRED EMBODIMENTS

The composition described herein has three necessary components. One of these is a synthetic, aliphatic polyamide. As used herein, a "synthetic polyamide" means a polymer which is made by man, and does not include natural fibers such as wools or silks. By an "aliphatic polyamide" is meant a polymer which has repeat units which include amide groups in the main chain, and in which at least some, preferably at least 50 mole percent, of these amide groups (through the nitrogen atoms and/or carbonyl carbon atoms of the amide groups) are connected to aliphatic carbon atoms. Preferred polyamides include nylon-6,6, nylon-6, nylon 12,12, and copolymers of nylon-6,6 and nylon 6. Nylon-6,6 and nylon-6, and copolymers thereof, are especially preferred and nylon-6,6 is more preferred.

Another essential ingredient of the inventive composition is a metal salt of a tungstic acid or a complex oxide acid of tungsten and a metalloid. Preferred metal salts include alkali metal salts of a tungstic acid, with sodium tungstate being especially preferred. By a complex oxide acid of tungsten and a metalloid is meant a complex oxide acid formed by a metalloid such as phosphorous or silicon and tungsten. Preferred complex oxide acids include silicotungstic acid and phosphotungstic acid, with silicotungstic acid being especially preferred. It is preferred that the composition contain about 0.2 to about 4 weight percent of the tungsten compound, based on the total weight of essential ingredients, and when silicotungstic acid is used a more preferred range is 0.2 to 1.0 weight percent.

The other essential ingredient of the inventive composition is a coagent which is chosen from melamine cyanurate, uracil, xanthine or oxamide. Melamine cyanurate and xanthine are preferred, with melamine cyanurate being especially preferred. When melamine cyanurate is used, up to about 3 weight percent (based on the total weight of essential ingredients) of a polyhydric alcohol may also be present. It is preferred that the polyhydric alcohol be pentoerythritol. It is also preferred that about 2 to about 4 weight percent of the coagent be present in the composition. Although the Applicants do not feel bound by the following, it is hypothesized that the coagents act (at least in part) by forming gas(es) under burning conditions.

Components (b) and (c) (the tungsten compound and coagent) may also be added as a compound or mixture in which the components are preblended and/or prereacted with each other, so long as the final amounts of (b) and (c) in the claimed composition are within the required ranges. For instance, one may contact in aqueous medium silicotungstic acid or phosphotungstic acid in the molar ratio of about 1 to about 24 moles of melamine per mole of the tungsten compound to prepare "reelamine salts" of the tungstic acids. It is preferred that the contacting be carded out at about 50° C. to about 100° C. It is believed that the melamine not only forms salts with the tungsten compound used, but also solvates the resulting salt much like water forms hydrates. Cyanuric acid may also be present so that the melamine forms a "mixed salt" with cyanuric acid and the silico- or phosphotungstic acid.

The compositions described herein have improved fire resistance compared to the polyamide alone, and are particularly useful as molding resins for making parts such as electrical and electronic parts such as bobbins, coil forms, connecters, fasteners, and for parts in equipment such as circuit breakers. These compositions also retain the good physical properties of the polyamides (i.e., desirable mechanical properties), particularly toughness. Toughness may be roughly estimated as being proportional to the product of the tensile strength and elongation, so the higher either or both of these are, the tougher the polymer. As can be seen from the Examples and Comparative Examples which hereinafter follow, the combination of the tungsten compound and coagent do not drastically decrease the elongation of the polymer composition, while at the same time providing a compound which has a V-0 flammability rating. This is an exceptional and valuable combination of properties which is usually not attainable with either component of the flame retarding system alone. Thus in a sense, a synergistic effect has been obtained. It is preferred that the composition be fire resistant enough so that it has a rating of V-0 in the Underwriters Laboratory test UL-94, at a thickness of 0.16 cm (¹/₁₆ inch). It is also preferred that the composition have an elongation at break of about 10% or more when measured using ASTM method D-638.

It is preferred that the tungsten compound and coagent be relatively well dispersed in the polyamide. The preferred degree of dispersion can be attained by producing the composition in any of a number of different types of equipment which are commonly used to disperse materials in polymers. For instance, a twin screw extruder with appropriate mixing screw sections can be used to satisfactorily melt mix the ingredients. It is also believed that the dispersion of the tungsten compound and coagent in the polymer is aided by starting with tungsten compound and/or coagent having relatively small particle sizes.

In the following non-limiting Examples, the following abbreviations are used:

MC—melamine cyanurate

PTA—phosphotungstic acid

STA—silicotungstic acid

In the Examples, Zytel® 101 refers to a standard molding grade of nylon-6,6 commercially available from E. I. du Pont de Nemours and Company, Wilmington, Del., U.S.A. The polymer was dried under standard conditions before molding or extrusion.

In Examples 1–5, extrusions were performed on a 30 mm Werner & Pfleiderer twin screw extruder, using a screw design having a mid range screw severity, at a melt temperature of 270°–300° C., and at rates of 11.3–15.9 kg per hour. Bars were molded on a 0.043 kg (1.5 oz) molding machine. Standard molding conditions for nylon-6,6 were used.

EXAMPLE 1

Zytel® 101 molding resin, ground to fine powder, was mixed with PTA (3% by weight of nylon), melamine cyanurate (3% by weight of nylon), and 1% pentaerythritol (1% by weight of nylon). The ingredients were thoroughly dispersed by tumbling. The mixture was compounded in a twin screw extruder with a vacuum port. The extruded material was then molded into bars, such bars being 0.16 cm thick, 13.3 cm (5.25") long, and 1.27 cm (0.5") wide. The bars were then subjected to the UL-94 test for flammability. A rating of V-0 was obtained.

Comparative Example A

Zytel® 101 molding resin, ground to fine powder, was mixed with PTA (3% by weight of nylon). The ingredients were thoroughly dispersed by tumbling. The mixture was compounded in a twin screw extruder with a vacuum port. The extruded material was then molded into bars, such bars being 0.16 cm thick, 13.3 cm long, and 1.27 cm wide. The bars were then subjected to the UL-94 test for flammability. A rating of V-0 was not obtained.

EXAMPLE 2

Zytel® 101 molding resin, ground to fine powder, was mixed with PTA (3% by weight of nylon) and uracil (3% by weight of nylon). The ingredients were thoroughly dispersed by tumbling. The mixture was compounded in a twin screw extruder with a vacuum port. The extruded material was then molded into bars, such bars being 0.16 cm thick, 13.3 cm long, and 1.27 cm wide. The bars were then subjected to the UL-94 test for flammability. A rating of V-0 was obtained.

EXAMPLE 3

Zytel® 101 molding resin, ground to fine powder, was mixed with PTA (3% by weight of nylon) and xanthine (3% by weight of nylon). The ingredients were thoroughly dispersed by tumbling. The mixture was compounded in a twin screw extruder with a vacuum port. The extruded material was then molded into bars, such bars being 0.16 cm thick, 13.3 cm long, and 1.27 cm wide. The bars were then subjected to the UL-94 test for flammability. A rating of V-0 was obtained.

EXAMPLE 4

Zytel® 101 molding resin, ground to fine powder, was mixed with PTA (3% by weight of nylon) and oxamide (3% by weight of nylon). The ingredients were thoroughly dispersed by tumbling. The mixture was compounded in a twin screw extruder with a vacuum port. The extruded material was then molded into bars, such bars being 0.16 cm thick, 13.3 cm long, and 1.27 cm wide. The bars were then subjected to the UL-94 test for flammability. A rating of V-0 was obtained.

EXAMPLE 5

Zytel® 101 molding resin, ground to fine powder, was mixed with PTA (3% by weight of nylon) and melamine cyanurate (3% by weight of nylon). The ingredients were thoroughly dispersed by tumbling. The mixture was compounded in a twin screw extruder with a vacuum port. The extruded material was then molded into bars, such bars being 0.16 cm thick, 13.3 cm long, and 1.27 cm wide. The bars were then subjected to the UL-94 test for flammability. A rating of V-0 was obtained.

Inventive Examples 6–13 and Comparative Examples B–G

In these Inventive Examples and Comparative Examples, the indicated (in Table 1)weights of STA, PTA, MC, and (under "kg nylon-6,6")ground Zytel® 101 were preblended by dry tumbling for 15 min. The blend was then fed through the feed port of barrel section one of a 28, 30 or 58 mm twin-screw extruder at a rate of 3.4 kg/hr, using a volumetric feeder. At the same time 10.2 kg/hr of Zytel® 101 was also fed to the same barrel section using a weight loss feeder. The indicated weight percents of each of the ingredients in this total mixture are shown in Table 1.

These blends were then molded into bars using typical injection molding machines, ranging from laboratory sized machines to commercial sized machines. Melt temperatures were typically about 275°–295° C., and mold temperatures were typically 45°–100° C. Also shown in Table 1 is the flammability rating in the UL-94 test at 0.16 cm thickness, and the percent elongation to break when tested using the ASTM D-638 test.

TABLE 1

| Example | kg STA | wt % STA | kg PTA | wt % PTA | kg MC | wt % MC | kg nylon-6,6 | wt % nylon | UL-94 | % Elong. |
|---|---|---|---|---|---|---|---|---|---|---|
| B | 0 | 0 | 0 | 0 | 0 | 0 | 3.4 | 100 | V-2 | 28 |
| C | 0 | 0 | 0 | 0 | 0.41 | 3 | 3 | 97 | V-2 | 11 |
| D | 0 | 0 | 0 | 0 | 0.82 | 6 | 2.6 | 94 | V-2 | 10 |
| E | 0 | 0 | 0 | 0 | 1.23 | 9 | 2.2 | 91 | V-0 | 6 |
| F | 0.54 | 4 | 0 | 0 | 0 | 0 | 2.9 | 96 | V-2 | 18 |
| G | 0 | 0 | 0.82 | 6 | 0 | 0 | 2.6 | 94 | V-2 | 23 |
| 6 | 0 | 0 | 0.41 | 3 | 0.41 | 3 | 2.6 | 94 | V-0 | 16 |
| 7 | 0 | 0 | 0.27 | 2 | 0.41 | 3 | 2.7 | 95 | V-0 | 23 |
| 8 | 0.034 | 0.25 | 0 | 0 | 0.41 | 3 | 2.9 | 97 | V-0 | 17 |
| 9 | 0.14 | 1 | 0 | 0 | 0.41 | 3 | 2.9 | 96 | V-0 | 19 |
| 10 | 0.21 | 1.5 | 0 | 0 | 0.41 | 3 | 2.9 | 95.5 | V-0 | 21 |
| 11 | 0.41 | 3 | 0 | 0 | 0.41 | 3 | 2.9 | 94 | V-0 | 18 |
| 12a | A | 0 | 0.41 | 3 | 0.41 | 3 | 2.9 | 94 | V-0 | 11 |
| 13b | 0 | 0 | 0.41 | 3 | 0.41 | 3 | 2.9 | 94 | V-0 | 13 | aThe ground polymer used was a blend of 90% nylon-6,6 and 10% nylon-6. The pure nylon fed directly to the extruder was a copolymer of 85 mole percent nylon-6,6 and 15 mole percent nylon 6
bAll nylon used was a blend of 90% nylon-6,6 and 10% nylon-6

EXAMPLE 14

With stirring in a beaker, 24 g of STA was dissolved in 50 g of water, and then 12 g of cyanuric acid was added. In a separate beaker 48 g of melamine was dissolved in 50 g of water. Both solutions were heated to 80° C. Both solutions were added together with vigorous stirring, and then stirred for 1 hr. The solid product was filtered from the aqueous solution and dried.

EXAMPLE 15

In a beaker 150 g of STA was dissolved in 50 g of water. In another beaker a slurry of 188 g of melamine in 170 g of water was made. The contents of both beakers were heated to 80° C., mixed together, and then stirred rapidly for 1 hr while heating. The solid product was filtered off and dried to a powder.

EXAMPLE 16

Using a procedure similar to that of Example 15, a phosphotungstic acid salt of melamine was prepared from 150 g of PTA and 188 g of melamine.

EXAMPLE 17

Using the procedure of Examples 6–11, a composition containing 3 weight percent of the composition prepared in Example 15 was made. It had a UL-94 rating of V-0 at 0.16 cm thickness. It had an elongation to break of 11%.

EXAMPLE 18

Using the procedure of Examples 6–11, a composition containing 3 weight percent of the composition prepared in Example 16 was made. It had a UL-94 rating of V-0 at 0.16 cm thickness. It had an elongation to break of 13%.

EXAMPLE 19

Using the procedure of Examples 1–5 a blend of 90 weight percent nylon-6,6 and 10 weight percent of the product of Example 14 was made. Bars 0.16 cm thick had a UL-94 rating of V-0.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A composition comprising:
    (a) a synthetic, aliphatic polyamide;
    (b) about 0.1 to about 6 weight percent of a metallic tungstic acid salt or a complex oxide acid of tungsten and a metalloid; and
    (c) about 2 to about 6 percent by total weight of one or more coagents selected from the group consisting of melamine cyanurate, uracil, xanthine and oxamide;
    and wherein all percents by weight are based on the total weight of (a)+(b)+(c);
    and provided that (b) and (c) may be added as a preblended mixture or a preformed compound which is a reaction product of (b) and (c), so long as the final amounts of (b) and (c) in the claimed composition are within the ranges required of (b) and (c), respectively.

2. The composition as recited in claim 1 wherein (b) is phosphotungstic acid or silicotungstic acid.

3. The composition as recited in claim 1 wherein (b) is an alkali metal salt of tungstic acid.

4. The composition as recited in claim 1 wherein about 0.2 to about 4 weight percent of (b) is present.

5. The composition as recited in claim 1 wherein said coagent is melamine cyanurate or xanthine.

6. The composition as recited in claim 5 wherein said coagent is melamine cyanurate.

7. The composition as recited in claim 2 wherein said coagent is melamine cyanurate.

8. The composition as recited in claim 1 wherein (b) is silicotungstic acid, present in an amount of about 0.2 to about 1.0 weight percent.

9. The composition as recited in claim 1 wherein about 2 to about 4 weight percent of said coagent is present.

10. The composition as recited in claim 7 wherein about 2 to about 4 weight percent of said coagent is present, and (b) is silicotungstic acid, present in an amount of about 0.2 to about 1.0 weight percent.

11. The composition as recited in claim 1 wherein said polyamide is selected from the group consisting of nylon-6,6, nylon-6 and copolymers thereof.

12. The composition as recited in claim 10 wherein said polyamide is nylon-6,6.

13. The composition as recited in claim 8 wherein said polyamide is nylon-6,6.

14. The composition as recited in claim 1 which is UL-94 V-0 at 0.16 cm thickness.

15. The composition as recited in claim 2 which is UL-94 V-0 at 0.16 cm thickness.

16. The composition as recited in claim 12 which is UL-94 V-0 at 0.16 cm thickness.

17. The composition as recited in claim 7 wherein up to about 3 weight percent of a polyhydric alcohol is also present.

18. The composition as recited in claim 17 wherein said polyhydric alcohol is pentaerythritol.

19. The composition as recited in claim 10 which is UL-94 V-0 at 0.16 cm thickness.

20. A composition comprising the product made by contacting in aqueous medium silicotungstic acid or phosphotungstic acid with melamine, wherein the molar ratio of said melamine to said silicotungstic acid or phosphotungstic acid is about 28:1 to about 1:1.

21. The composition as recited in claim 20 wherein cyanuric acid is also present during said contacting.

22. The composition as recited in claim 20 wherein said contacting is carried out at about 50° C. to about 100° C.

* * * * *